Aug. 24, 1943. T. O. RUEB 2,327,821
UNIVERSAL JOINT FRICTION ATTACHMENT
Filed June 12, 1942
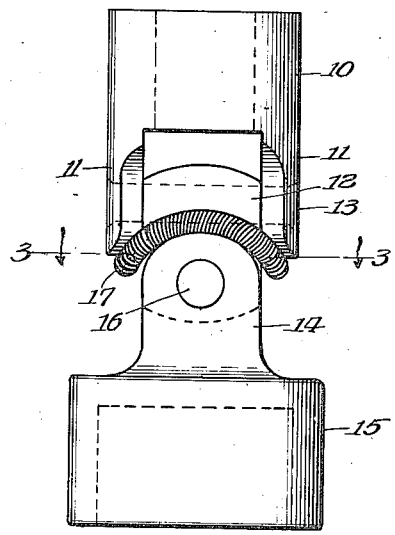
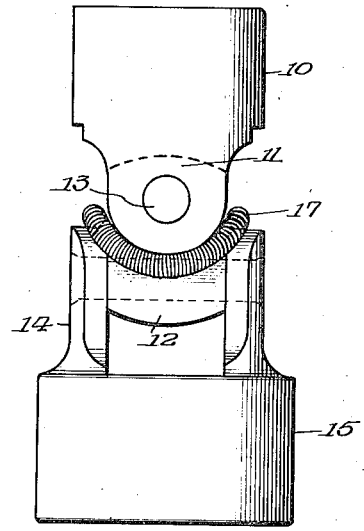
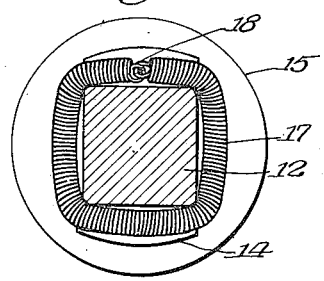
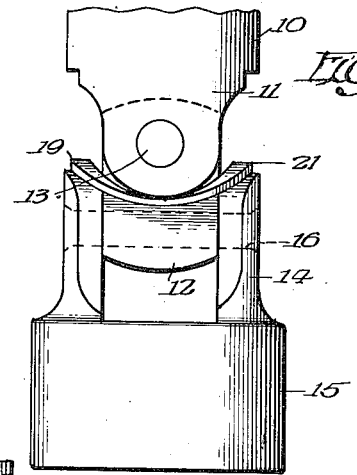
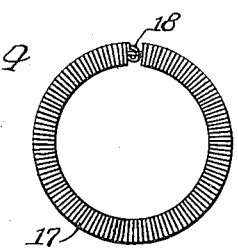
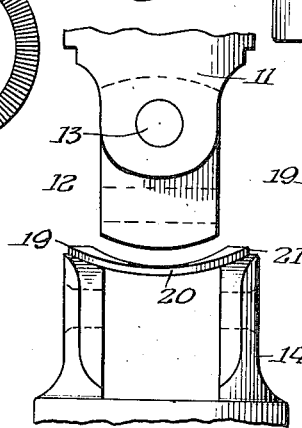
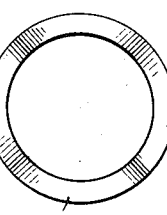
Inventor
Theodore O. Rueb
By Glenn S. Noble
Atty.

Patented Aug. 24, 1943

2,327,821

UNITED STATES PATENT OFFICE 2,327,821

UNIVERSAL JOINT FRICTION ATTACHMENT

Theodore O. Rueb, Chicago, Ill., assignor to The Sherman-Klove Co., Chicago, Ill., a corporation of Delaware Application June 12, 1942, Serial No. 446,737

4 Claims. (Cl. 64—17)

This invention relates to improvements in universal joints, particularly of the kind used for wrenches where it is necessary or desirable to provide sufficient friction on the joint elements to enable them to be adjusted and held at desirable angles. This is particularly true in connection with the use of wrenches for nuts or bolts in inaccessible positions, but the desirability and use of these devices is sufficiently common so that further description is not necessary.

The objects of the present invention are to provide an improved universal joint having novel means for providing friction between the parts; to provide a universal joint having a garter ring, spring ring, or spring washer for producing the desired friction; to provide a detachable friction producing element which may be applied to existing universal joints to convert them into friction joints; and to provide such other novel features and advantages as will be described more fully hereinafter.

In the accompanying drawing illustrating this invention,

Fig. 1 is a side view of a universal joint embodying the same;

Fig. 2 is a similar view taken at 90° from that of Fig. 1;

Fig. 3 is a sectional view taken substantially on the line 3—3 of Fig. 1;

Fig. 4 is a detail of the garter ring or spring ring;

Fig. 5 is a side view showing a modified form of construction in which a spring ring similar to a spring washer provides the friction element, the parts being shown separated preparatory for assembling;

Fig. 6 is a view similar to Fig. 5 showing the parts after assembly; and

Fig. 7 is a detail of the friction ring or washer.

As shown in Figs. 1 to 4, the universal joint head or socket 10 is provided with the usual forks or lugs 11 for engagement with a block 12 which is pivotally attached thereto by means of a pin or rivet 13. The opposite end of the block is secured to the forks 14 of the head or socket member 15 by means of pin or rivet 16, this constituting the common form of universal joint construction.

In order to provide the desired friction to hold the joint parts in adjusted position, I utilize a garter spring or coiled spring ring 17 such as shown in Fig. 4 having the ends fastened together by closed eyes 18 to form the ring. This ring is placed over the block 12 with one portion riding or bearing on the ends of the yokes or forks 13, and other portions riding or bearing on the ends of the yokes or forks 14 as shown in Figs. 1 and 2. The ends of the forks which engage with the springs are preferably substantially semi-circular in order to give the largest amount of bearing surface for the spring and also to prevent undue distortion of the spring when the yoke members are moved to adjusted positions. It will be noted that the spring tension will tend to spread the yoke members 13 and 14 apart whereby friction will be provided not only between the yoke members and the spring, but also between the yoke members and the pivotal connections with the block. I have found that this simple spring attachment may be made at a low cost and may be applied to the universal joint without any special machining or preparation of the joint members. This eliminates construction costs. Furthermore, the rings may be readily applied to the joints after they have been completed and thus simplifies the assembly of the device.

In the modification shown in Figs. 5 to 7, I utilize a spring 19 which is similar to a spring washer and which is preferably slightly curved as shown at 20 in one plane and at 21 in a plane at right angles in order to take over or engage closely with the opposed forks of the joint. This spring should be only partially flexed as shown in Fig. 5 so that when the block 12 is moved downwardly to engage with the coacting forks for insertion of the pivot or pin 16, sufficient tension will be placed on the spring so that it will tend to urge the forks of the respective joint members apart after they have been assembled as shown in Fig. 6. In other words, with this construction, it is necessary to form the spring so that the necessary tension will be provided when the parts are assembled and it is not possible to spring the ring into position as with the form just described. However, the operation is substantially the same as it will be noted from Fig. 6 that the spring tends to produce a pressure or tension on the ends of the yokes which is transmitted to the block through the pivots and thus friction is provided between the various parts which is sufficient for the purposes described.

While I have shown the preferred forms of my invention, it may be necessary to modify or change the same to adapt it to different joints or constructions, and therefore I do not wish to be limited to the particular construction shown and described except as set forth in the following claims in which I claim:

1. A universal joint having oppositely pivotally connected forked members and having a resilient ring interposed between the ends of the opposed forks and frictionally engaging with said ends, said ring being stressed to place tension on said members and to cause friction between the ring and the ends of the forks.

2. A universal joint, comprising two end members and an intermediate member, means providing a pivotal connection between each end member and the intermediate member, the axes of said pivotal connections being at substantially right angles to each other, and spring means interposed between the faces of the end members to provide a predetermined amount of friction between all of said members to hold said members in adjusted positions while permitting the end members to be adjusted with respect to each other.

3. A universal joint for the purposes set forth, comprising two end members and an intermediate member, means providing a pivotal connection between each end member and the intermediate member to permit said members to be adjusted angularly with respect to each other, and a garter spring around the intermediate member engaging with the end members and establishing frictional engagement between the respective members to hold the members in adjusted positions.

4. A universal joint comprising forked end members and an intermediate block pivotally connected with the forks of the end members, and resilient means positioned between the adjacent portions of the forks of the respective end members and tending to urge said members apart to cause friction between the movable parts of the joint and also between the forks and the resilient member to hold the forks in adjusted positions with respect to each other.

THEODORE O. RUEB.